United States Patent
Manbeck et al.

(10) Patent No.: US 7,113,223 B2
(45) Date of Patent: Sep. 26, 2006

(54) HIGH RESOLUTION COLOR CONFORMING

(75) Inventors: Kevin Manbeck, Cranston, RI (US);
Jay Cassidy, Los Angeles, CA (US);
Stuart Geman, Providence, RI (US);
Donald Geman, Amherst, MA (US);
Donald McClure, Providence, RI (US)

(73) Assignee: MTI Film LLC, Providence, RI (US)

( * ) Notice: Subject to any disclaimer, the term of this patent is extended or adjusted under 35 U.S.C. 154(b) by 407 days.

(21) Appl. No.: 10/125,651

(22) Filed: Apr. 18, 2002

(65) Prior Publication Data
US 2002/0180885 A1 Dec. 5, 2002

Related U.S. Application Data

(60) Provisional application No. 60/285,562, filed on Apr. 20, 2001.

(51) Int. Cl.
*H04N 7/01* (2006.01)

(52) U.S. Cl. .................. 348/453; 382/167; 358/523

(58) Field of Classification Search .............. 348/453, 348/445, 448, 458, 459, 441, 96, 449, 558; 382/167, 254, 298–300
See application file for complete search history.

(56) References Cited

U.S. PATENT DOCUMENTS

| | | | |
|---|---|---|---|
| 5,373,375 A * | 12/1994 | Weldy | 358/523 |
| 5,418,570 A * | 5/1995 | Ueno et al. | 375/240.14 |
| 5,481,275 A * | 1/1996 | Mical et al. | 345/698 |
| 5,677,735 A * | 10/1997 | Ueno et al. | 375/240.15 |
| 5,748,235 A * | 5/1998 | Kondo et al. | 348/222.1 |
| 6,075,887 A * | 6/2000 | Brett | 382/167 |
| 6,175,592 B1 * | 1/2001 | Kim et al. | 375/240.16 |
| 6,181,826 B1 * | 1/2001 | Weldy et al. | 382/240 |
| 6,304,277 B1 * | 10/2001 | Hoekstra et al. | 345/600 |
| 6,320,619 B1 * | 11/2001 | Jiang | 348/447 |
| 6,356,310 B1 * | 3/2002 | Horishi et al. | 348/458 |
| 6,421,094 B1 * | 7/2002 | Han | 348/569 |
| 6,614,448 B1 * | 9/2003 | Garlick et al. | 345/605 |
| 6,657,603 B1 * | 12/2003 | Demetrescu et al. | 345/32 |
| 6,766,067 B1 * | 7/2004 | Freeman et al. | 382/299 |
| 6,788,347 B1 * | 9/2004 | Kim et al. | 348/441 |
| 6,882,359 B1 * | 4/2005 | Truc et al. | 348/96 |
| 2002/0113891 A1 * | 8/2002 | Felts | 348/446 |

OTHER PUBLICATIONS

Burcher, M. "HD Production", KTI Digitales Kino Fachtagung—25.9.2/English 25.3.3; http://www.mimikri.ch/fachtagung_matti_E.pdf.
Burcher, M. "Mimikri", http://www.mimikri.ch/; 2002.

* cited by examiner

*Primary Examiner*—Paulos M. Natnael
(74) *Attorney, Agent, or Firm*—Bromberg & Sunstein LLP

(57) ABSTRACT

A method, system and computer program product for color conforming video material at a given resolution is provided. The given video material is first converted to a lower resolution version of the same material. Then a color corrected version of the lower resolution version of the video material is obtained. A computer then analyzes the lower resolution version and the color corrected version of the lower resolution version in the same three dimensional color space to determine suitable color values for a color conforming version of the video material at the given resolution.

26 Claims, 6 Drawing Sheets

HIGH RESOLUTION COLOR CONFORMING

PRIORITY

The present application claims priority from U.S. Provisional Patent Application No. 60/285,562 which was filed on Apr. 20, 2001, entitled "High Resolution Color Conforming" which is incorporated herein by reference in its entirety.

TECHNICAL FIELD

This invention generally relates to color correction, and more particularly to color conforming high-definition or high-resolution digital video.

BACKGROUND ART

The process of transferring film to video requires that the video material undergo color correction. The principal reasons for color correction are: i) The far smaller dynamic range of video as compared with film; ii) The need to calibrate or standardize the colors within scenes due to fluctuations in the film stock; and iii) The necessity of having natural-looking transitions from one scene to another. The conventional color correction process involves two videotape (VTR) machines, a color correction device, and a trained expert. The color correction device operates on the original, uncorrected material, usually available as digital video tape, and produces a new digital video tape with corrected colors.

The conventional color correction process is typically performed using standard-definition (SD) color correction machines on SD video material. In modern times, however, the demand for high-definition (HD) and high-resolution (HR) video has grown dramatically with the advent of e-cinema, HDTV, and other new broadcast media. As a result, there is also a demand for efficient and inexpensive color correction in these video formats as well. Conventional SD color correction machines, however, cannot process material at higher resolution, such as HD video. Consequently, such material can only be color-corrected with expensive, dedicated software and hardware.

SUMMARY OF THE INVENTION

A method for color conforming video material at a given resolution is provided. The video material is composed of a collection of fields/frames and each field/frame includes color information designated by pixels. The given video material is first converted to a lower resolution version of the same material. Then a color corrected version of the lower resolution version of the video material is obtained. Finally, the computer analyzes the lower resolution version and the color corrected version of the lower resolution version in the same three dimensional color space to determine suitable color values for a color conforming version of the video material at the given resolution. The suitable color values for color conforming are determined by selecting two pixels in the lower resolution version having color component values which are higher and lower respectively, than the same color component in the given resolution. Then a distance value between all of the pixels for the color component in the given resolution and the pixels for the color component in the lower resolution version is calculated and minimized in relation to the higher and lower color component values selected previously. This minimized value is used in a linear interpolation calculation including the higher and lower color component values of the color corrected version of the lower resolution version to determine the values for color conforming the given resolution video material. In the preferred embodiment, the given resolution of the video material is in a high-definition format and the lower resolution version is in a standard-definition format. The lower resolution version is obtained by downsampling the given resolution.

In another embodiment, the given resolution of the video material is in a high-resolution format and the lower resolution version is in a standard-definition format. In yet another embodiment, the given resolution is in a high-resolution format and the lower resolution version is in a high-definition format.

BRIEF DESCRIPTION OF THE DRAWINGS

The foregoing features of the invention will be more readily understood by reference to the following detailed description, taken with reference to the accompanying drawings, in which:

FIG. 2A shows an SD lattice;

FIG. 2B shows an HD lattice;

FIG. 2C shows the HD lattice superimposed on the SD lattice;

DETAILED DESCRIPTION OF SPECIFIC EMBODIMENTS

As used in the following description the term "pixel" shall mean a single point of a graphic image in video material. The term "lattice" shall refer to a grouping of pixels comprising video material. The more pixels that are contained in a lattice, the higher the resolution of the video. The term "HD" shall relate to the high-definition video format. Typical HD video formats have resolutions of 1920×1080 pixels or 1280×720 pixels. The term "HR" shall relate to the high-resolution video format. Typical HR video formats have resolutions of 2048×1536 pixels, 4096×3072 pixels, or higher. The term "SD" shall relate to standard-definition video format. Typical SD video formats have resolutions of 720×486 pixels (American format) or 720×576 pixels (European format). It should be understood by those of ordinary skill in the art that SD, HD, and HR may have any number of resolutions and are used to designate relative resolution sizes wherein SD is a lower resolution than HD, which is a lower resolution than HR. The term "color component" shall represent a color value in a color coordinate system. For example, the RGB color coordinate system contains three components: red, green, and blue. The term "color correction" shall refer to the act of altering the color of one or more images wherein the image and the color corrected image share the same resolution. The term "color conforming" shall refer to the act of using color information from one or more images in a first resolution to determine color information in a second resolution. In a preferred embodiment the second resolution is a higher resolution than the first resolution. The term "visual material" shall refer to a digitally displayable sequence of images which may be film originating, video originating or computer generated. It should be understood by one of ordinary skill in the art that video material may be composed of interlaced fields or non-interlaced frames which are composed of pixels. The term "logic" as used herein shall apply to circuitry, software code and any combination of circuitry with software code.

Figure 1:
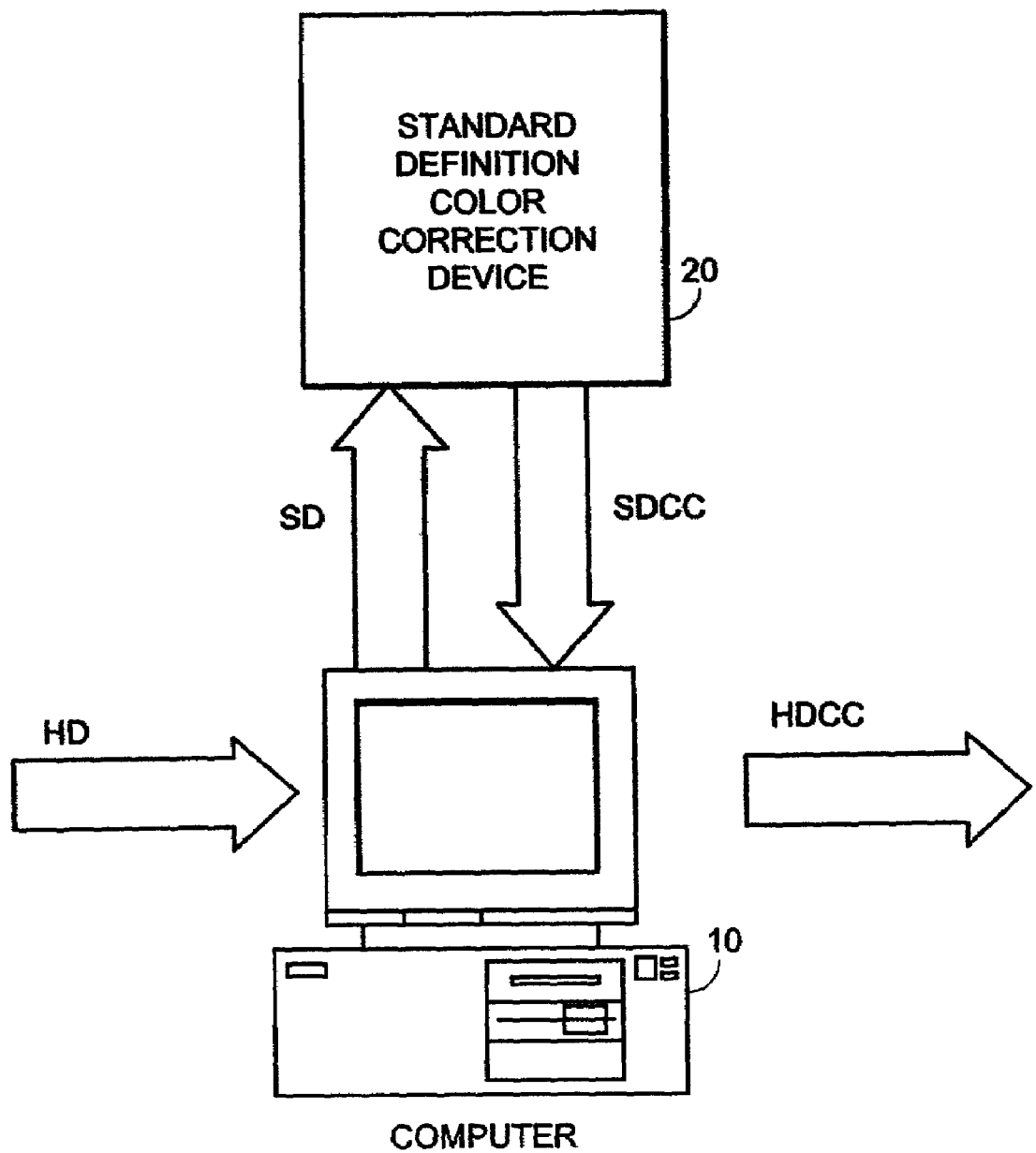
FIG. 1 is a diagram of a color conformation system which may be configured to carry out the disclosed method.

FIG. 1 is a diagram of a color conformation system which may be configured to carry out the disclosed method. FIG. 1 consists of a computer 10 coupled to a color correction device 20. Computer 10 runs a computer program for color conforming HD or HR video in accordance with disclosed embodiments of the invention. Color correction device 20 converts SD video into a color corrected version (SDCC) in the same spatial-temporal format as SD.

In a first embodiment of the invention, video in a HD format is color conformed based on the corresponding, color-corrected video in a SD format from a digital tape or other digital representation of the original material in an HD format. This information can be represented as a collection of fields (or frames) HD={HD(t), t=1,2, ... T}, where T is the total number of fields (or frames). Each HD(t) is a color image HD (x,y,t), where (x,y) ranges over a (high-definition) lattice of pixels $L_{HD}$ and HD (x,y,t) is a vector of three components in some color coordinate system, e.g., red, green and blue. A digital tape or other digital representation of the same material in an SD format, denoted by SD={SD (t), t=1, ... ,T}, where each SD(t) is a color image residing on a lattice of pixels $L_{SD}$ of smaller dimensions than $L_{HD}$. Typically, SD is obtained by downsampling HD and SDCC is created through use of color-correction device such that SDCC is in the same spatial-temporal format as SD.

The method produces a color-corrected version of HD which will be denoted HDCC, where $$HDCC = \{HD(t); t = 1, 2, ... T\}$$
$$= \{HDCC(x, y, t); (x, y) \in L_{HD}, t = 1, , T\}$$

and each HDCC (x,y,t) can be represented as a point in three-dimensional real space which carries the color information at pixel (x,y) in field t. For simplicity, we will assume the color system is red, green, blue; the process is identical for any other color representation. The corresponding three components of SD(x,y,t) will be denoted by ($SD_1$(x,y,t), $SD_2$(x,y,t), $SD_3$(x,y,t), and similarly for SDCC(x,y,t), HD(x,y,t) and HDCC(x,y,t).

Figure 2A:
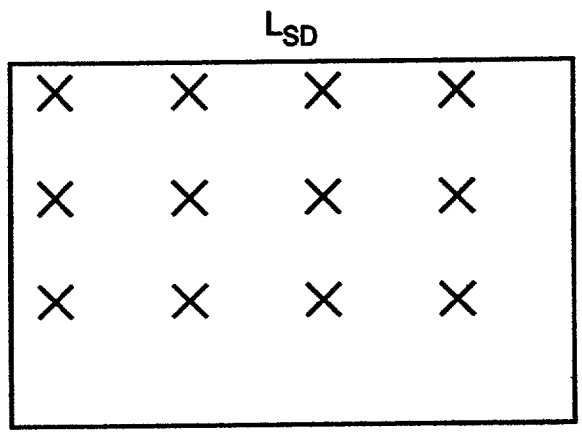
FIGS. 2A–C show various lattices.
Figure 2B:
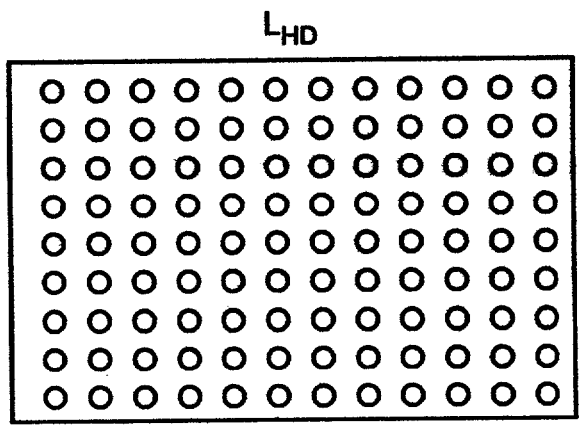
Figure 2C:
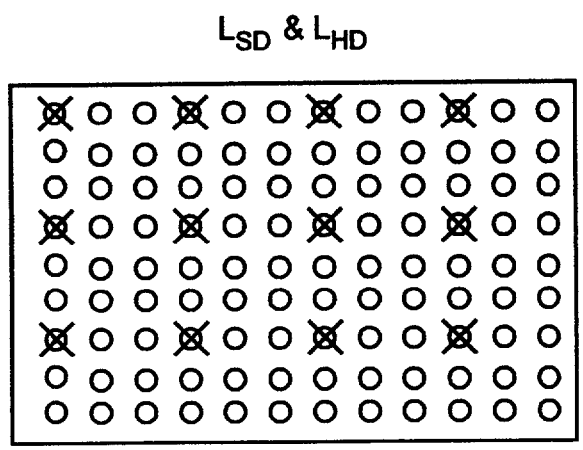

In general, the pixel (x,y) does not belong to the standard-definition lattice $L_{SD}$ because this lattice has smaller resolution than $L_{HD}$ as shown in FIG. 2A–C in which FIG. 2A shows a lattice having a resolution of 4×3 while FIG. 2B shows $L_{HD}$ having a resolution of 12×9 which is three times large in both dimensions. As can be seen in FIG. 2C in which $L_{HD}$ is superimposed on $L_{SD}$, the majority of the pixels from the HD version do not reside at pixel locations in the LD lattice.

Figure 3:
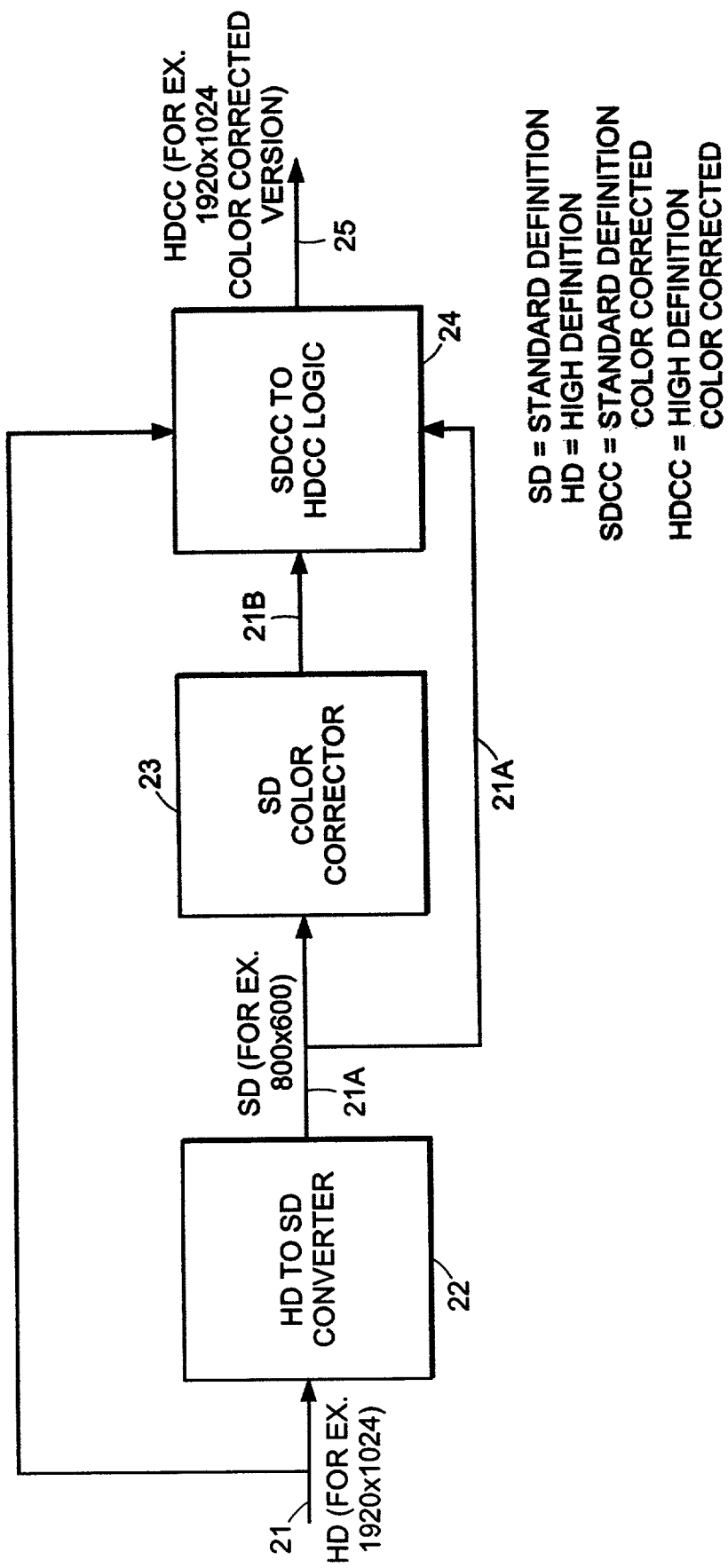
FIG. 3 is a block diagram which shows the modules which are used to color conform an HD source to a HDCC version using SD and SDCC color information.

FIG. 3 is a block diagram which shows the modules which are used to color conform an HD source to a HDCC version using SD and SDCC color information. First a HD source 21 is presented to a converter 22 which will typically down sample the high definition version 21 to a standard definition version 21A. The SD version 21A is passed to a standard definition color corrector 23. Standard definition color corrector devices are well known in the art and correct the color to an SDCC version 21B. Any conventional SD color correction process can be used in order to produce SDCC. Next SDCC to HDCC logic 24 is employed. This logic 24 receives the high definition sequence of video images 21, the standard definition sequence of video images 21A and the color corrected standard definition sequence of images 21B. The SDCC to HDCC logic 24 uses the color information from both the standard definition version 21A and the color corrected version 21B in order to determine the color values for each pixel of an image in the high definition color corrected format 25. It should be recognized that although the provided description is directed to digital video sequences, the following methodology may be applied to single digital images.

It should be understood by one of ordinary skill in the art that the high definition video image stream needs to be calibrated prior to being color corrected due to systematic differences in the representation of colors between the high definition format and the standard definition format (e.g. log scale, bit lengths etc.). The resolution of the display device is dependent on the phosphors that are being used. Calibration is represented by a general transformation F. After the calibration step suitable color values HDCC((x,y,t)= ($HDCC_1$(x,y,t), $HDCC_2$(x,y,t), $HDCC_3$(x,y,t)) are determined for the transformed video sequence HD based on analyzing SD sequence and SDCC sequence in a spatial neighborhood of (x,y,t). Finally, the inverse of the calibration process is applied.

Mathematically, the three steps can be summarized as $$HD(x, y, t) \rightarrow F^{-1}(HD(x, y, t))$$
$$\rightarrow HDCC(x, y, t)$$
$$\rightarrow F(HDCC(x, y, t))$$

Henceforth, we can assume the inverse mapping $F^{-1}$ has already been accounted for in the representation of HD and that the forward mapping F will be applied to the output HDCC.

Figure 4:
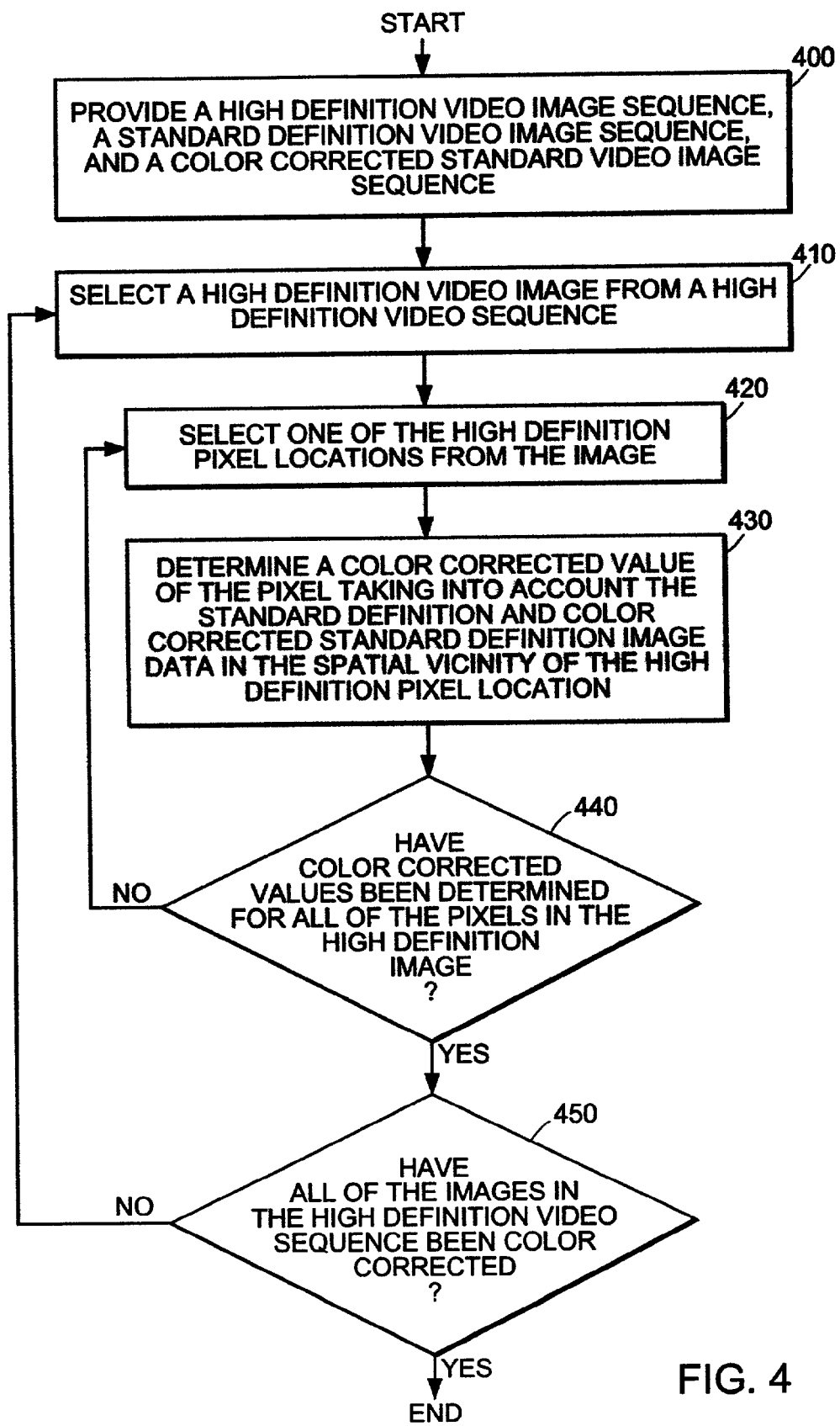
FIG. 4 is a flow chart of the process for creating a high definition color corrected version of a high definition video sequence employing a standard definition color correction device.

FIG. 4 is a flow chart of the process for creating a high definition color corrected version of a high definition video sequence employing a standard definition color correction device. The following steps occur within the SDCC to HDCC logic of FIG. 3. First the logic receives a high definition video image sequence, a standard definition video image sequence and a color corrected standard video image sequence (Step 400). The logic then selects a high definition video image from the high definition video sequence which is preferably the first image in the sequence (Step 410). The logic then selects a first pixel location within the selected image for determining a color corrected value (Step 420). A color corrected value is then determined (Step 430). The value is arrived at by selecting a group of pixels within the standard definition version which would reside proximate to the high definition pixel location if the standard definition video image was overlaid on the high definition image. From the group of pixels in the standard definition image, pixel locations are determined which have color information having minimal color distances to the color value of the pixel in the high definition format. Using the determined locations, color values at the determined locations in the color corrected standard definition format are interpolated to determine the color value for the high definition color corrected pixel. Once all color components of the color vector are determined for a pixel (e.g. R,G,B values), the logic determines if all of the color corrected values for the high definition image have been determined (Step 440). If the answer is no another pixel location is selected. If the answer is yes, then the logic determines if all of the images in the high definition video sequence have been color corrected (Step 450). If the answer is no, the logic selects another video image from the high definition video sequence and continues the process in an iterative manner. If the answer is yes and all images are color corrected, then the process ends and the high definition video sequence can be output to either a memory location or stored on some digital medium. Thus for each field (or frame) t, for each pixel(x, y)∈$L_{HD}$, and for each color component $HD_i(x,y,t)$, i=1,2,3 a HDCC value is determined.

Figure 5:
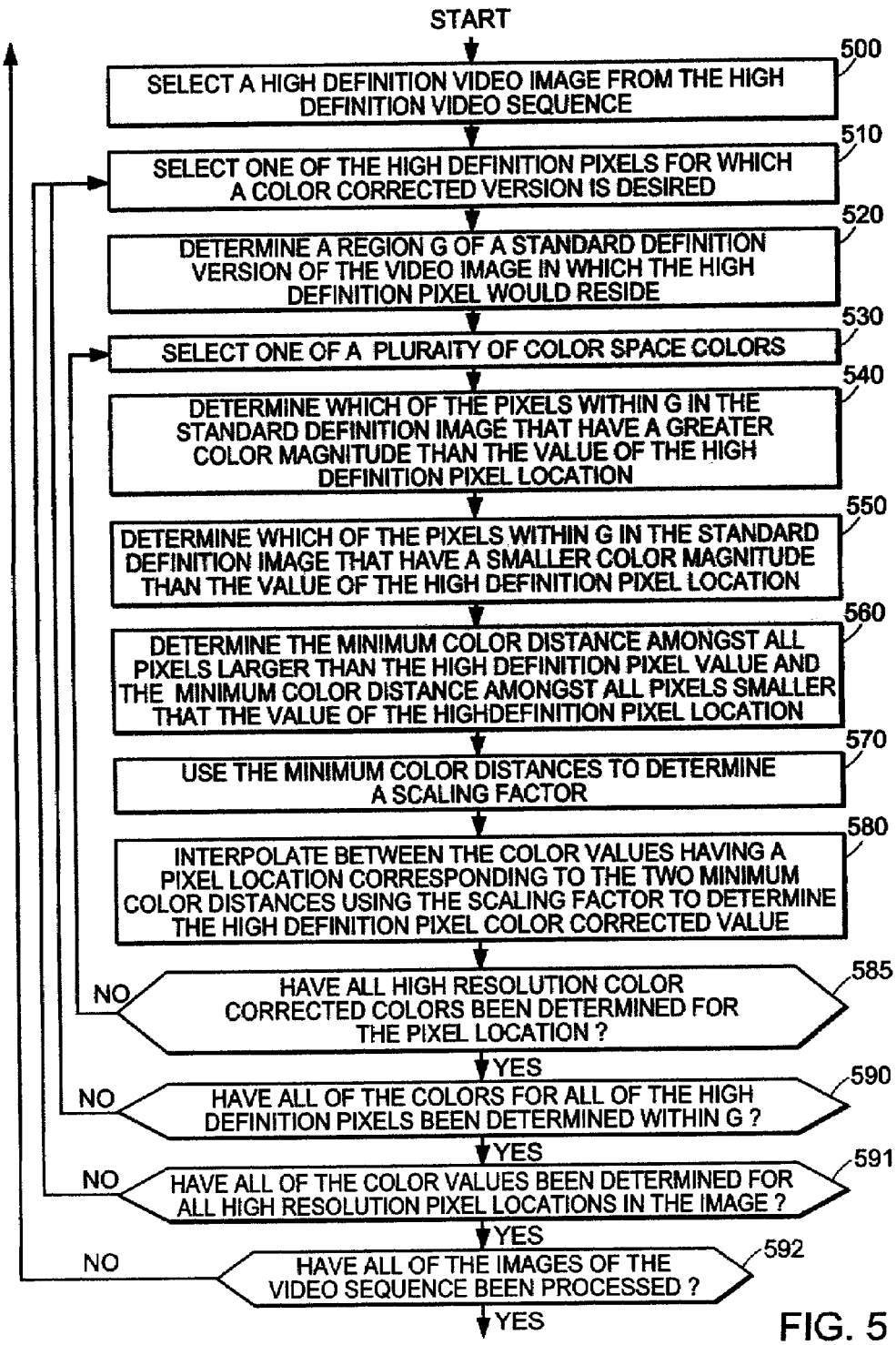
FIG. 5 is flow chart which further elaborates on the steps which are used for determining a high resolution color conforming version.
Figure 6:
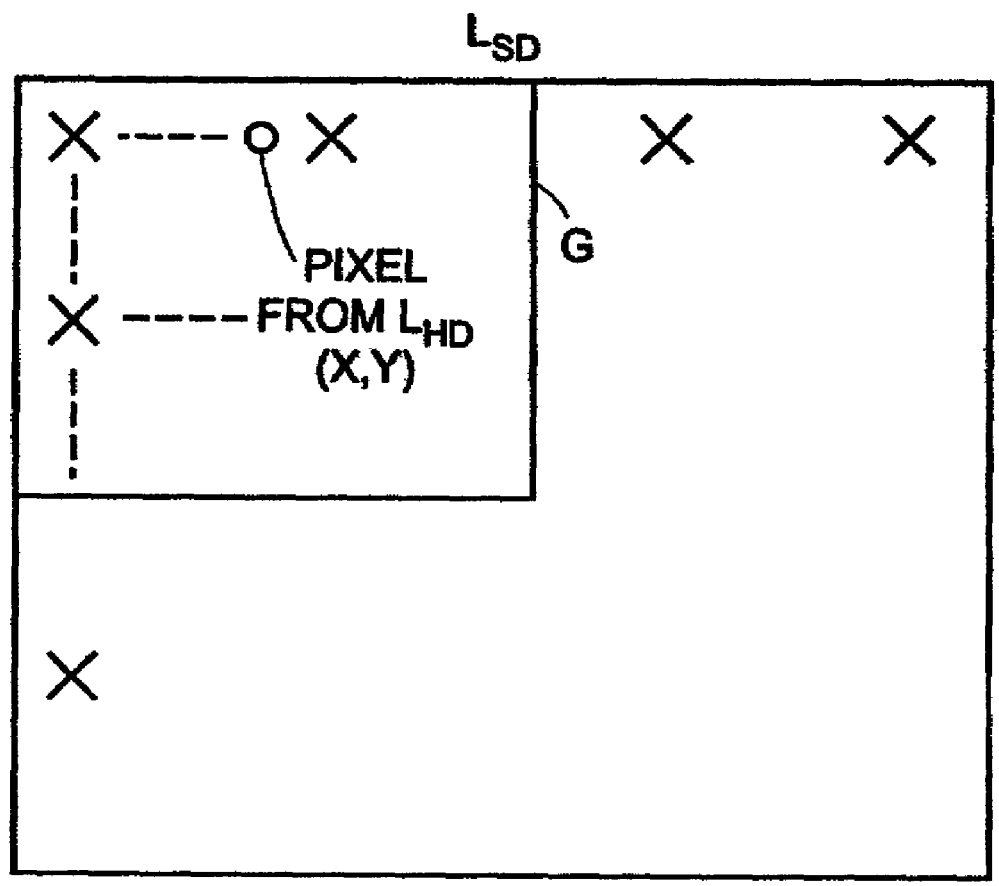
FIG. 6 is a diagram showing region G of the SD lattice of FIG. 2A.

FIG. 5 is flow chart which further elaborates on the steps which are used for determining a high resolution color conforming version. A high definition video image is selected from the sequence of high definition video images (Step 500). Thus t is fixed for HD(x,y,t). A high definition pixel location is selected from the image (Step 510) A region G is then selected. G⊂$L_{SD}$ and is a neighborhood of the pixel (x,y). G resides in the SD lattice $L_{SD}$ (Step 520). A typical size for G is eighty-one pixels arranged in a 9×9 array roughly centered at (x,y); however other sizes may also be selected for G. Thus G={$(u_j,v_j)$, j=1,2, . . . ,81} where $(u_j,v_j)$∈$L_{SD}$. FIG. 6 shows an example of G using the SD lattice from FIG. 2A wherein G is a 2×2 size. The size of the region G is generally predetermined and automatically selected by the computer program.

A color component from the color space is then selected, say red from a red, green, blue color space, denoted by $HD_1(x,y,t)$ (Step 530).

A set of pixels within the region G is then determined which have color values for the color component being determined which are greater than that of the color value of the high definition pixel such that B*={(u,v),∈G:$SD_1$(u,v, t)≧$HD_1$(x,y,t} (Step 540).

Similarly, a set of pixels within region G which have a color value for the selected color component which is smaller than that of the color value of the high definition pixel is determined such that $B_*$={(u,v),∈G: $SD_1$(u,v,t) <$HD_1$(x,y,t} (Step 550).

Thus, B* (respectively, $B_*$) is the set of pixels in the region G at which the red component of SD(t) is larger (resp., smaller) than the red component of $HD_1$(x,y,t).

Next color distances in three dimensional color space are calculated for each pixel within region G. For each (u,v)∈G, the distance is calculated as follows:

$$d(u, v) = \|SD(u, v, t) - HD(x, y, t)\|$$
$$= \left[\sum_{i=1}^{3} (SD_i(u, v, t) - HD_i(x, y, t))^2\right]^{1/2}.$$

It should be understood that there are other metrics that may be used for defining the distances. For example absolute values may be used in place of squared distances.

The pixel having the minimal color distance from the high definition pixel is then selected from B* and $B_*$. For B* the minimum color distance is calculated as follows $$d(u^*, v^*) = \min_{(u,v) \in B^*} d(u, v).$$

For $B_*$ the minimum color distance is $$d(u_*, v_*) = \min_{(u,v) \in B^*} d(u, v)$$

(Step 560).

The spatial position of $(u_*,v_*)$ and $(u^*,v^*)$ from the standard definition lattice are then used to select the SDCC values which correspond to the spatial positions. For example, assuming that the minimum color distance for $d(u^*,v^*)$ corresponded to pixel (7,10) and that the minimum distance for $d(u_*,v_*)$ corresponded to pixel (8,12), the values of the pixels at (7,10) and (8,12) in the standard definition color corrected version would be used in determining the high definition color corrected value.

The SDCC values are then used to interpolate a high definition color corrected value. For example, the red value $HDCC_1(x,y,t)$ assigned to (x,y,t) will be a weighted average of $SDCC_1(u^*,v^*,t)$ and $SDCC_1(u_*,v_*,t)$. The weighting factor is λ is determined such that $$\lambda = \frac{d(u^*, v^*)}{d(u^*, v^*) + d(u_*, v_*)}$$

(Step 570). The weighted average is dependant on the distance in three-dimensional color space between HD(x,y,t) and the colors in SD(t) at the pixels in G=B*∪$B_*$.

The color component value, for red, given to (x,y,t) is a convex combination of the red values of SDCC(t) at $(u^*,v^*)$ and $(u_*,v_*)$ (Step 580). Specifically, $HDCC_1(x,y,t)=\lambda SDCC_1(u_*,v_*,t)+(1-\lambda)SDCC_1(u^*,v^*,t)$ Note, for example, that if λ=0 or λ=1, i.e., there is a perfect match in color space between HD(x,y,t), and a pixel in G, then the color-corrected red value of that pixel is chosen for $HDCC_1$(x,y,t).

The color corrected red component of HDCC(t) at (x,y), namely $HDCC_1$(x,y,t), will depend on all of the colors in the pixels of G in both SD(t) and SDCC(t), namely the set of values $C_1 \cup C_2$ where $C_1=\{SD_i(u_j,v_j,t), i=1,2,3,j=1, \ldots ,81\}$ and $C_2=\{SDCC_i(u_j,v_j,t), i=1,2,3,j=1, \ldots ,81\}$ This analysis therefore involves the "context" of (x,y,t) in both the space of colors and the lattice of pixels, in the sense that color conforming at (x,y,t) takes into account all the SD and SDCC image data in field t in the spatial vicinity of point (x,y). Color conformation is based on interpolating among the (red) values in $C_1$.

The logic next decides if all of the high resolution color corrected color components of the color vector (e.g. R,G,B) have been determined for the pixel location (Step 585). In the present example, the method would return to Step 530 in which either green or blue would be selected and the process would continue. Once the color corrected red, green and blue values for a pixel in the high definition image are determined the logic determines if all of the pixel locations in the high resolution image have color corrected values (Step 591). An optional intermediate step may occur in which the system checks to see if all of the pixels from the high definition lattice which would reside within G have been determined (Step 590). If the answer is no to either inquiry, the method loops back and selects another pixel in the high definition image. It should be understood by those of ordinary skill in the art that a new region G may be selected for each new pixel or the region G may be reused depending on whether the selected high definition pixel location would reside within region G. Once an entire image is color corrected, the method checks to see if all of the images in the video sequence have been color corrected (Step 592). If the answer is yes the method ends otherwise a new image is selected and the process repeats until the high definition video sequence is completely color corrected. The final result is a video sequence HDCC(t), t=1, . . . ,T, rendered to be consistent with the true color correction process in SD, which, as mentioned earlier, involves a more comprehensive analysis based on various technical and artistic criteria.

It should be understood by one of ordinary skill in the art that other color coordinate system, e.g., chrominance and luminance values, may be used in place of R,G,B.

In alternative embodiments, the very same process can be applied in order to perform HR coloring conforming based on SD color correction and HR color conforming based on HD color correction.

In another variation, the analysis is spatial-temporal instead of purely spatial in the sense that information is inferred from the SD color correction for nearby fields, for instance t−1, t+1, in addition, to t. It should be clear that the term t refers to either a field or a frame. For the following example, a frame will be assumed. A pixel (x,y) is fixed for a frame for which a value HDCC(x,y,t) is desired. The neighborhood G can now be selected from a set of pixels from different frames (for ex. t−1, t, t+1). Thus, G may consist of 3×81 pixels being the three 9×9 neighborhoods of (x,y) in the three frames t−1,t and t+1. $B^*$ and $B_*$ are determined and the procedure continues as described above. In other embodiments a weighting may be applied to the various frames at different times. For example, t may have a weighting of 0.5 while t−1 and t+1 may have a weighting of 0.25.

If a temporal component is included in the analysis, scene changes should be accounted for to limit the reliance of color information between scene changes. Scene changes may be manually determined wherein an operator identifies each scene or may be automatically determined. If a frame occurs at a scene change such that at t+1 the scene has changed, then the values of G for t+1 would be given a zero weighting to avoid using the color information from the changed scene.

In another alternative embodiment, visual material from a higher resolution that has been color corrected may be used to create color corrected lower resolution visual material. The same interpolation technique would be employed as described above. The original higher resolution visual material would first be down sampled to the lower resolution format. A pixel location in the lower resolution would be selected for which color corrected color information is desired and a region G in the original high resolution format would be chosen which would include the low resolution pixel location if the lower resolution lattice was superimposed on the higher resolution lattice. The interpolation technique would continue wherein $B^*$ and $B_*$ would be determined using the values in G from the higher resolution lattice. The minimum color distances would then be calculated and this would be used to determine a weighting factor as described above. The pixel locations for the minimum color distances from $B^*$ and $B_*$ would then be used to select the pixel locations in the color corrected high resolution lattice. The corresponding color information values would then be used for interpolating the color corrected lower resolution color information value. The color corrected lower resolution version would therefore depend on both the color information from the high resolution visual material and the color corrected high resolution visual material.

The disclosed method for color conforming may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method for color conforming visual material having a given resolution, the method comprising:
   receiving visual material at a given resolution;
   determining at least one color conforming color component for each pixel of the visual material at the given resolution using a plurality of pixels from a lower resolution version of the visual material that is not color conformed and a plurality of pixels from a color corrected image that is a color corrected lower resolution version of the visual material, wherein information in the lower resolution version of the material is used to select color information in the color corrected image; and outputting the color conforming color components for the visual material at the given resolution.

2. A method according to claim 1 further comprising:
converting the visual material at the given resolution to the lower resolution version.

3. A method according to claim 2 further comprising:
color correcting the lower resolution version using a lower resolution color conforming device wherein the lower resolution color conforming device produces the lower resolution color corrected version.

4. The method according to claim 3, wherein in determining, for each image of the visual material, each color corrected color component for a pixel in the given resolution is determined at least using one or more color components from a field of pixels from the lower resolution version where the field resides in a spatial vicinity of the pixel from the given resolution version of the visual material.

5. The method of claim 4, wherein the color values for color conforming are determined by:
selecting one or more pixels in the lower resolution version, which for a selected color has a color component which is greater than a color component of the pixel in the given resolution;
selecting one or more pixels in the lower resolution version, which for a selected color has a color component which is less than a color component of the pixel in the given resolution; and
interpolating between the higher and lower color component values from a color corrected lower resolution version having pixel locations corresponding to the pixels having color components greater than and less than the color component of the pixel in the given resolution.

6. The method according to claim 5, wherein each color corrected color component for the given resolution is determined as a weighted average of the pixels having color components greater than and less than the color component of the pixel in the given resolution.

7. The method according to claim 6, wherein the selected pixels have a color distance from one or more of the color components of the pixel in the given resolution.

8. The method according to claim 7, wherein a region of an image is selected in the lower resolution version which if the given resolution version is overlaid on the lower resolution version the pixel location of the given resolution version is contained therein.

9. The method according to claim 8, wherein the color distance is a multi-dimensional color distance.

10. The method according to claim 8, wherein the distance is used for detecting amongst pixels having color components greater than or equal to the color component of the pixel in the given resolution a pixel location having the minimal color distance to the pixel in the given resolution;
and determining a pixel amongst pixels having color components less than or equal to the color component of the pixel in the given resolution a pixel location having the minimal color distance to the pixel in the given resolution.

11. The method according to claim 10 further comprising:
selecting two color components from a color corrected low resolution image having corresponding pixel locations to the pixels having the minimal color distances.

12. The method according to claim 11, wherein a color component for the pixel in the given resolution is selected using the two color components from the color corrected low resolution image.

13. The method according to claim 12 further comprising determining the color component for pixel of the given resolution by taking a weighted average of the two color components from the color corrected low resolution image.

14. The method according to claim 13 wherein a weighting factor is determined based upon the minimal color distances from the group of pixels which have a color component which is greater than or equal to the color component of the pixel of the given resolution and from the group of pixels which have a color component which is less than or equal to the color component of the given resolution.

15. The method of claim 1, wherein the given resolution of the video material is in a high-definition format and the lower resolution version is in a standard-definition format.

16. The method of claim 1, wherein the given resolution of the video material is in a high-resolution format and the lower resolution version is in a standard-definition format.

17. The method of claim 1, wherein the given resolution of the video material is in a high-resolution format and the lower resolution version is in a second high-definition format.

18. The method of claim 2, wherein the color components are from the RUB color coordinate system.

19. A system for color conforming given resolution visual material, the system comprising:
a standard definition color correcting device for receiving standard definition visual material and producing color corrected standard definition material; and
logic for receiving as input the given resolution visual material, producing standard definition visual material from the given resolution visual material, providing the standard definition visual material to the standard definition color correcting device, receiving the color corrected standard definition material and producing color conformed given resolution visual material for each pixel based in part upon a subset of pixels from the standard definition visual material selected based upon their relationship to the pixel in the given resolution visual material, the color corrected standard definition material.

20. The system according to claim 19 wherein for each pixel, the logic interpolates between two pixel component values from the standard definition color corrected visual material to determine a given resolution color corrected value for the pixel.

21. The system according to claim 19 wherein the logic performs weighted averaging to determine a given resolution color corrected value for each pixel.

22. The system according to claim 20 wherein the logic determines minimum color distances at or above and at or below a component value for the pixel in the given resolution and uses the minimum color distances for determining the two pixel component values for interpolation.

23. A system for color conforming visual material in a given resolution, the system comprising:
receiving logic for receiving visual material in the given resolution and the visual material in a lower resolution;
a lower resolution color corrector for receiving the visual material in the lower resolution from the receiving logic, and outputting color corrected lower resolution visual material; and
conforming logic for receiving the given resolution visual material and lower resolution material from the receiving logic, receiving the color corrected lower resolution material from the color corrector, and outputting color conforming visual material at the given resolution taking into account for each pixel at the given resolution, visual material from the color corrected lower resolution visual material and a subset of pixels in the lower resolution visual material selected based upon their relationship to the pixel in the given resolution visual material.

24. The system according to claim 23 wherein for each component value of the color conforming given resolution visual material, the conforming logic interpolates between two component values from the color corrected lower resolution visual material wherein the two component values from the color corrected lower resolution visual material are selected based in part on corresponding components in the lower resolution visual material.

25. The method according to claim 1, wherein in the step of determining, a lower resolution color conforming device is used.

26. The system according to claim 23, further comprising:
a resolution converter for converting the visual material in the given resolution to a lower resolution.

* * * * *

UNITED STATES PATENT AND TRADEMARK OFFICE
CERTIFICATE OF CORRECTION

PATENT NO. : 7,113,223 B2  Page 1 of 1
APPLICATION NO. : 10/125651
DATED : September 26, 2006
INVENTOR(S) : Manbeck et al.

It is certified that error appears in the above-identified patent and that said Letters Patent is hereby corrected as shown below:

Col. 10, line 27
replace "RUB"
with --RGB--.

Signed and Sealed this

Fifth Day of December, 2006

JON W. DUDAS
*Director of the United States Patent and Trademark Office*